United States Patent [19]

Hishinuma et al.

[11] Patent Number: 5,735,974
[45] Date of Patent: Apr. 7, 1998

[54] AN IRRADIATED INTERMETALLIC COMPOUND CONTAINING PART OF LIGHT-WATER REACTOR

[75] Inventors: Akimichi Hishinuma; Katsumaro Fukai, both of Ibaraki-ken, Japan

[73] Assignee: Japan Atomic Energy Research, Tokyo, Japan

[21] Appl. No.: 763,112

[22] Filed: Dec. 10, 1996

[30] Foreign Application Priority Data

Dec. 12, 1995 [JP] Japan ................. 7-323251

[51] Int. Cl.$^6$ ................. G21C 3/07; G21C 3/06
[52] U.S. Cl. .......... 148/330; 148/333; 148/337; 148/423; 148/425; 148/421; 148/428; 148/429; 148/239; 148/565; 148/430; 376/457; 376/901
[58] Field of Search .............. 376/457, 901, 376/906; 148/565, 407, 239, 408, 409, 410, 421, 422, 423, 425, 429, 428, 405, 430, 442, 900, 330, 333, 337

[56] References Cited

U.S. PATENT DOCUMENTS

| | | | |
|---|---|---|---|
| 3,563,728 | 2/1971 | Allio et al. | 376/457 |
| 3,813,263 | 5/1974 | Rosenberg | 148/527 |
| 4,299,625 | 11/1981 | Michel et al. | 376/900 |
| 4,360,389 | 11/1982 | Urguhart | 376/900 |
| 4,444,599 | 4/1984 | Ikeya | 148/565 |
| 4,648,912 | 3/1987 | Sabol et al. | 148/565 |

FOREIGN PATENT DOCUMENTS

| | | | |
|---|---|---|---|
| 132907 | 2/1985 | European Pat. Off. | 148/403 |
| 57-203756 | 12/1982 | Japan. | |
| 61-243175 | 10/1986 | Japan. | |
| 3-140446 | 6/1991 | Japan. | |

OTHER PUBLICATIONS

J.T. Niemann and R.P. Sopher, "Embrittlement of Multipass Welds in Zircaloy 2" Welding Research Supplement 1/56; pp. 27–31.

Primary Examiner—David A. Simmons
Assistant Examiner—Margery S. Phipps
Attorney, Agent, or Firm—Banner & Witcoff, Ltd.

[57] ABSTRACT

A part of a light-water reactor, for example, a cladding for a light-water reactor has at least a portion made of an intermetallic compound, such as $Ni_3Al$, $Ni_2Al_3$, $TiAl$, $Ti_3Al$, $Pt_2Si$, $PtSi$, $FeAl_2$, $CoAl$, and $MoSi_2$, thereby having limited irradiation degradation by fast neutrons, improved ductility and usability at high temperatures the intermetallic compound is produced by a process comprising a step of irradiating the intermetallic compound with at least one selected from the group consisting of a neutron, a light ion, and an electron. The intermetallic compound may contain a twin and a third additional element segregatedly present or forms a second phase at or near to a grain boundary.

5 Claims, 5 Drawing Sheets

AN IRRADIATED INTERMETALLIC COMPOUND CONTAINING PART OF LIGHT-WATER REACTOR

BACKGROUND OF THE INVENTION

1. Filed of the Invention

The present invention relates to a part constituting a light-water reactor and particularly a part of a light-water reactor that has limited irradiation induced degradation by fast neutrons, improved ductility and usability at high temperatures.

2. Discussion of the Related Art

Recently, the energy generated by the nuclear power plants makes up about 30 percent of the overall generated energy in Japan, and almost all of the nuclear power plants are light-water reactors.

The nuclear reactor is a large system in which sintered uranium dioxide is consumed so that the nuclear fission at the core produces heat, which is taken out by highly pressurized water at high temperatures or highly pressurized vapor at high temperatures.

The core includes a fuel bundle having a number of fuel rods in bundle, control rods and water. The fuel rod includes pellets made of sintered uranium dioxide and a cladding encapsulating the pellets.

However, neutrons and heat generated at the core cause radiation damage onto parts of the light-water reactor, particularly structural parts close to the core, thereby decreasing mechanical properties thereof. This phenomenon, however, has not received sufficient attention by researchers, and knowledge of physical, chemical processes of the radiation damage have been limited. Instead, studies on age deterioration of the materials are receiving utmost attention.

Therefore, it plays critical roles in the development of the light-water reactor to develop materials suitable for parts of the light-water reactor such as the cladding, support plates, and so on, which are close to the core being exposed to severe operating conditions.

In the early stage, stainless steel was used as materials for the cladding. In these days, however, zirconium alloys, such as zircalloy-2, zircalloy-4, and a zirconium-niobium alloy are generally used in the cladding because of small absorption cross section of neutrons, higher melting point of about 1800° C., higher mechanical strength and higher resistance against corrosion.

However, the zirconium alloys generally take the hexagonal system, which has anisotropy in the crystal structure so that exposure to neutrons tends to give irradiation growth in the crystal, thereby deforming the cladding or decreasing ductility.

Although the zirconium alloys have higher resistance against corrosion than the stainless steel, the alloys are prone to undergo oxidation in water at high temperatures. To prevent the oxidation, oxygen dissolved in the light water is reduced or alternatively, a hydrogen gas is blown into the light water. Moreover, the creep strength of the alloys significantly decreases at temperatures over 650° C. to 700° C., thereby operating temperatures are severely limited to lower temperatures.

The other parts of the light-water reactor that are not exposed to operating environment as severe as the cladding may undergo creep and decrease mechanical properties to a certain extent over a period of time due to the effects of high temperatures, neutrons, and so on.

Therefore, there has been needs for revolutionary materials suitable for parts of the light-water reactor, such as the cladding for the light-water reactor.

SUMMARY OF THE INVENTION

An object of the present invention is to provide structural materials suitable for a part of a light-water reactor, which solve the aforementioned problems, which has limited irradiation-induced degradation by fast neutrons, improved ductility and usability at high temperatures.

The present inventors found that exposure of an intermetallic compound to high-energy-particles, for example, neutrons and so on, improves mechanical strength and ductility thereof and applied a patent application for the intermetallic compound having improved ductility at low temperatures. In the present invention, the finding is applied to a part of the light-water reactor so as to solve the aforementioned problems. An object of the present invention is to provide a part of the light-water reactor, such as a cladding and so on, which has, upon exposure to neutrons and so on, limited mechanical degradation and oxidation while sustaining mechanical properties at high temperatures.

In the present invention, the presence of a specific third elements improves endurance to high-energy-particles, mechanical properties so that the intermetallic compound having improved ductility is further modified.

The present invention provides a part adapted to a light-water reactor, comprising at least a portion composed of an intermetallic compound, thereby solving problems relating to conventional structural materials used in the light-water reactor.

BRIEF DESCRIPTION OF THE DRAWINGS

The invention is described in greater detail below with reference to the enclosed drawings in which.

DETAILED DESCRIPTION OF THE PREFERRED EMBODIMENT

The present inventors found that exposure of an intermetallic compound to high-energy-particles, for example, neutrons and so on improves mechanical properties thereof, and, in the present invention, the finding is applied to a part of the light-water reactor, such as a cladding and so on for the light-water reactor, which is disposed inside the light-water reactor.

Irradiation of a specific amount of neutrons and so on onto the intermetallic compound introduces twins in grains of the intermetallic compound, thereby improving mechanical properties. In the present invention, the part of the light-water reactor preferably has at least a portion made of the irradiated intermetallic compound.

Part of Light-Water Reactor

In the present invention, a "part of a light-water reactor" refers to a various part constituting a light-water reactor and should be interpreted broadly. For example, the "part of a light-water reactor" includes the light-water reactor itself that contains said part.

The light-water reactor may be classified to a boiling water reactor and a pressurized water reactor depending on designs, and the present invention can be favorably applied to both types of the light-water reactor.

Figure 1:
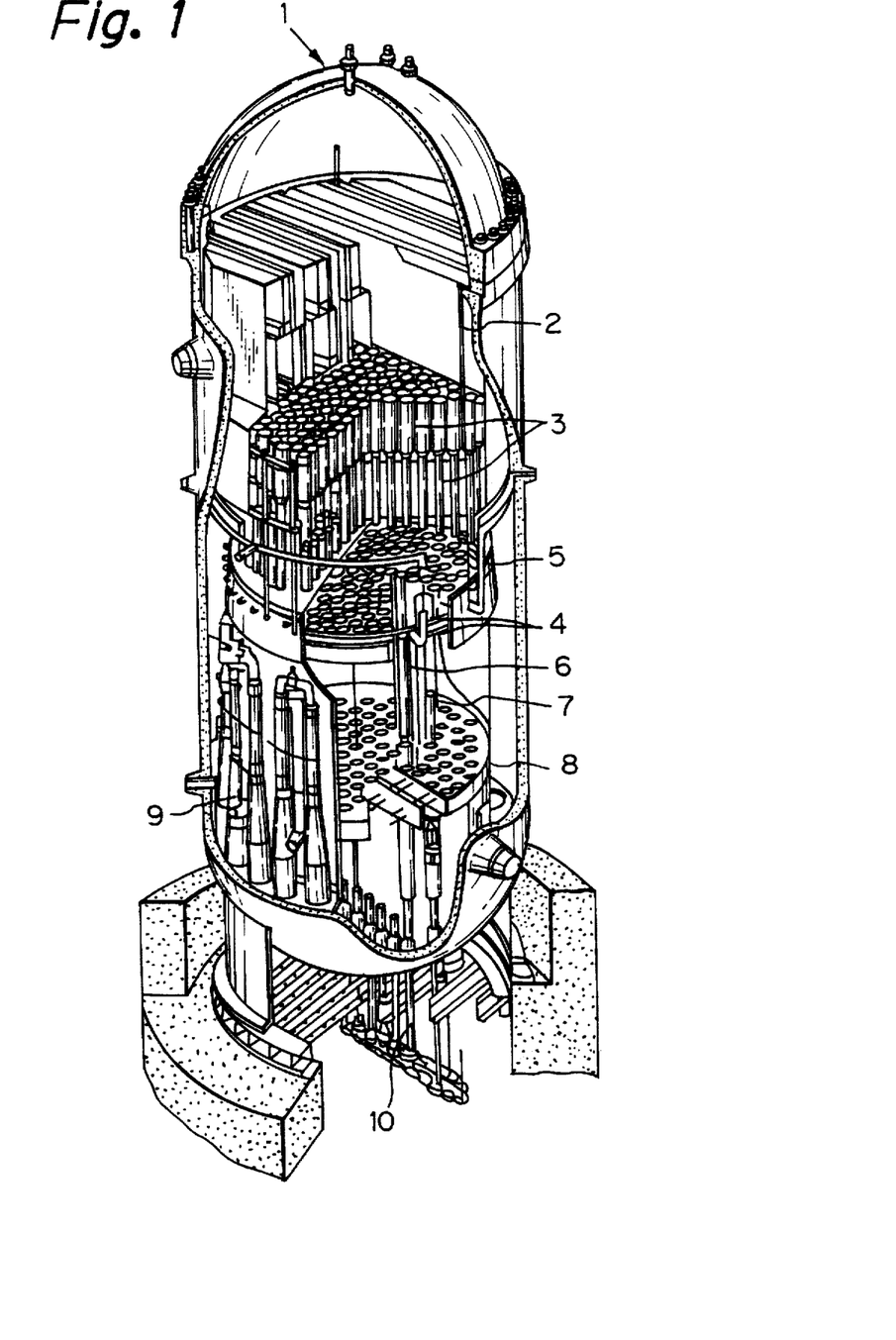
FIG. 1 is a schematic view of a boiling water reactor.
Figure 2:
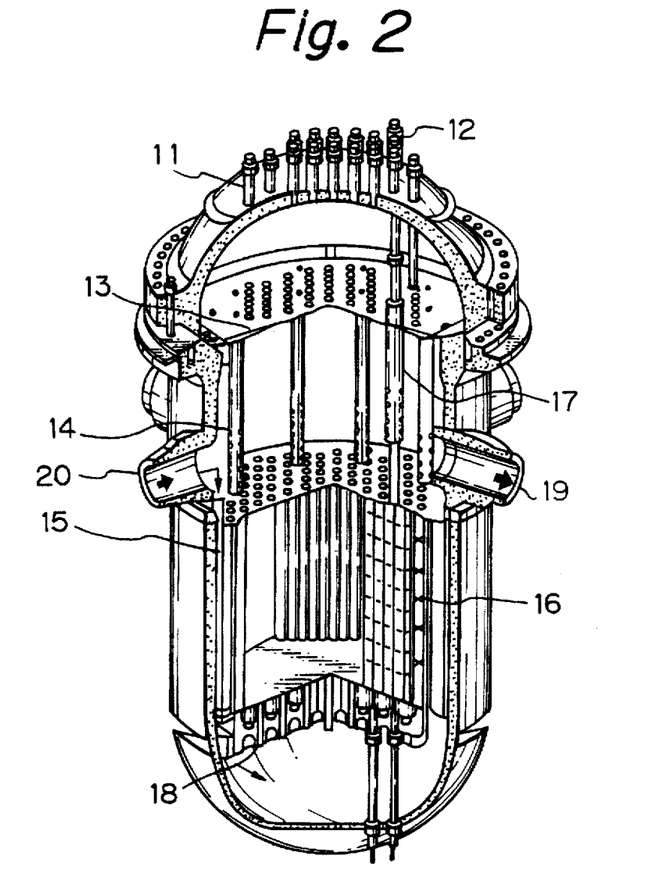
FIG. 2 is a schematic view of a pressurized water reactor.

Specifically, the boiling water reactor, as shown in FIG. 1, has such parts of the light-water reactor as a reactor pressure vessel 1, a vapor drier 2, a gas-water separator 3, a core spray sparger 4, an upper lattice plate 5, a fuel bundle 6, control rods 7, a core support plate 8, a jet pump 9, a mechanism 10 for driving control rods and so on. The pressurized water reactor, as shown in FIG. 2, has such parts of the light-water reactor as a reactor pressure vessel 11, a mechanism 12 for driving control rods, an upper support plate 13, support columns 14 for supporting an upper core plate, the upper core plate 15, a fuel bundle 16, control rods 17, a core support plate 18, an outlet nozzle 19, an inlet nozzle 20 and so on.

Figure 3:
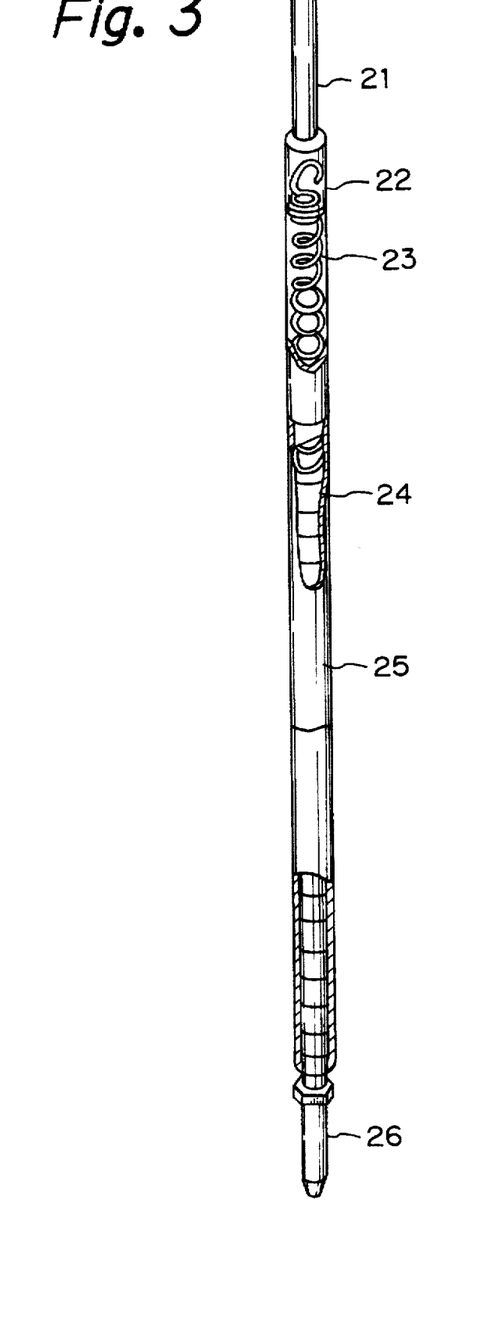
FIG. 3 is a schematic view of a cladding for a light-water reactor.

A fuel cladding for a light-water reactor, as shown in FIG. 3, is defined as a component of the fuel bundle for mechanically holding oxide fuel and so on so as to efficiently burn the fuel, thereby stably generating fast neutrons over a long period. A lattice plate, having a plate shape, for mechanically holding scores of or hundreds of the cladding for a light-water reactor is also a component in the fuel bundle. The lattice plate may be called a support grating, a grid plate or a tie plate.

The fuel bundle includes an upper end stopper 21, a plenum 22, a plenum spring 23, a fuel pellet 24, the cladding 25 for a light-water reactor, and a lower end stopper 26.

The part of a light-water reactor according to the present invention includes accessories such as screws, plugs, bands and so on.

The part of a light-water reactor according to the present invention requires to include at least a portion using an intermetallic compound as structural materials. The intermetallic compound does not become brittle upon exposing to fast neutrons and so on. On contrary, the intermetallic compound improves mechanical properties during the operation of the light-water reactor, thereby remaining usable at high temperatures. Probably, fast neutrons and so on introduce twins in grains made of the intermetallic compound, thereby improving mechanical strength and ductility.

When the intermetallic compound further includes a third element, the segregation and/or precipitates of the third element and/or the second phase in or near to a grain boundary, thereby further improving ductility of the intermetallic compound.

It is sufficient for improving endurance of a container to constitute at least a portion of the part of the light-water reactor. For example, the part may have a side closer to the core that is prone to be exposed to neutrons or which is prone to a temperature increase, and the side may be made of the intermetallic compound, and the other portions of the part may be made of conventional zirconium alloys, stainless steel, ceramics, and so on.

In other words, a conventional cladding may be directly or indirectly laminated with the favorable intermetallic compound to form a composite so as to provide the part of the light-water reactor, which does not become brittle by neutrons and so on, and which has improved mechanical strength, ductility and usability at high temperatures.

Alternatively, all of the part of the light-water reactor may be made of intermetallic compound by such steps as forming and welding so as to further improve endurance or so as to withstand neutrons having higher energy.

Subsequently, typical parts of the light-water reactor according to the present invention are explained in detail. However, the parts of the light-water reactor according to the present invention are not limited to these parts.

A. Cladding for Light-Water Reactor

The cladding for the light-water reactor is defined as above, and the cladding preferably has a pin shape so as to prevent excessive thermal stress thereon, which is caused by large heat flux from the light-water reactor. Specifically, the cladding may have a cylindrical tubular shape having an outer diameter of 1 to 20 mm, a wall thickness of 0.1 to 5 mm, and a length of 1000 to 5000 mm.

The cladding preferably has a plug at least one end so as to facilitate introducing and removing pellets.

Preferably, the cladding is formed of a plenum at the tip so as to release a fission-product gas. When the cladding has a plenum at the upper end thereof, it is advantageous to remove heat upon damage on the cladding. On the other hand, when the cladding has the plenum at the lower end thereof, the plenum is relatively far away from the center of the core, thereby decreasing temperatures thereof. Consequently, a short plenum is sufficient, thereby decreasing flow resistance of sodium passing therethrough, which is advantageous.

When the pellets have a plate shape in view of the application, operating purpose and so on, preferably, the cladding may have a rectangular shape complementary in shape to the pellets. The cladding may have 1 to 100 mm in depth, 1 to 100 mm in width, 1000 to 5000 mm in length, and 0.1 to 5 mm in wall thickness.

B. Support Plate

The support plate is defined as above, and the support plate preferably has a shape complementary to the cladding. Generally, the support plate is formed of circular through holes for the cladding, and the support plate is preferably formed of other through holes for control rods. Although the number of the support plates is not limited, at least two support plates are preferably arranged in the upper side and the lower side in the axial direction of the cladding. The light-water reactor may further preferably have 6 to 9 support plates.

Specifically, the support plate may have a plate shape with thickness of 0.1 to 20 mm, and the circular through holes may have a diameter of 2 to 25 mm.

Intermetallic Compounds

The intermetallic compound is explained hereinafter. The intermetallic compound is defined as a compound that is made of at least two metals, metal and semi-metal or metal and nonmetal and that has an ordered crystal structure.

There are two types of the intermetallic compound: in one type called an ordered alloy, an ordered arrangement of the atoms transforms into a disordered arrangement at temperatures between the transition point and the melting point; in the other type, the ordered arrangement keeps intact up to a melting point or some reactions relating to phase diagram. The latter type of the intermetallic compound is more favorable to the present invention than the former type of the ordered alloy, which predominantly involves metallic bonding.

Specifically, the latter type includes compounds that are capable of having a compositional range in both sides of the stoichiometry while keeping the same crystal structure, such as $Ni_3Al$, $Ni_2Al_3$, $TiAl$, and $Ti_3Al$, and other compounds that have the stoichiometry without any compositional range therein, such as $Pt_2Si$, $PtSi$, $FeAl_2$, $CoAl$, and $MoSi_2$. Both compounds are favorably used in the present invention.

In the present invention, the intermetallic compound that is prone to form the gamma phase is preferable since the gamma phase has features to remain stably ordered up to the melting point of the crystals.

In the present invention, the system is favorable in which twinning deformation serves as one of the deformation modes since introduction of twins in the intermetallic compound improves ductility at low temperatures by means of a twinning-deformation mechanism.

A. Twins

In the present invention, it is favorable to introduce twins in the intermetallic compound so as to improve ductility at low temperatures mainly by means of the twinning-deformation mechanism.

The deformation of the intermetallic compound is caused by the twinning deformation and the dislocation slip deformation, and the twinning deformation is considered to be a predominant mechanism in a low temperature region, specifically from room temperature to about 700° C.

As for the twin, the twin has a mirror plane in the arrangement of atoms in a grain. The twins are preferably dispersed as grains in a matrix of the intermetallic compound in the gamma phase since, as mentioned before, the gamma phase has features to remain stably ordered up to the melting point of the crystal and since the intermetallic compound including the gamma phase has high mechanical strength and toughness.

Subsequently, the relationship between the introduction of twins and growth thereof is explained. First, a nucleus of a crystal needs to be formed to introduce twins. For example, irradiation of neutrons and so on of the present invention is required to forcefully form nuclei of twins. Then, the nuclei grow into and form twins, thereby improving ductility at low temperatures of the intermetallic compound.

Therefore, "the introduction of twins" encompasses a whole process of introducing nuclei of twins, growing the nuclei, and recrystallizing the twins. The "twin formation" refers to a process of growing nuclei of twins into twins.

Specifically, the introduction of the twin nuclei refers to a state that assembly of crystal defects is present in the intermetallic compound. The presence of a dislocation loop with stacking fault, which may be called Frank loop, along with the assembly of the crystal defects give a twin nucleus. The Frank loop has features not to contain an anti-phase boundary, which is characteristic to the ordered alloy. The Frank loop does not easily convert to a perfect loop since the conversion requires to contain the anti-phase boundary, which has higher energy.

B. Third Additional Element

Subsequently, the third additional element in the intermetallic compound including twins and so on is explained. The third additional element refers to an element having a trace or small amount in the intermetallic compound, which decreases stacking fault energy of the intermetallic compound, which enhances the crystal growth of gamma phase and so on, and which enhances the introduction of twins.

The third additional element is segregatedly present at a grain boundary or forms a second phase so as to increase the rupture stress of the intermetallic compound, thereby improving ductility at lower temperatures of the intermetallic compound. The grain boundary refers to an interface between adjacent grains. However, the third additional element may be present not only in the grain boundary per se but also in portions of the grains that is close to the grain boundary.

As long as the aforementioned object and the effect are achieved, the third additional element may be metallic or non-metallic and may be combined or not combined to the base elements. The essential features of the third additional element are that the third additional element is segregatedly present at the grain boundary and its vicinity or forms a second place.

The third additional element includes a substitutional element, for example, V, Cr, Zr, Mn, and so on and an interstitial element, for example, B, C, and so on. An addition of a trace amount of the interstitial element favorably gives the intermetallic compound micro alloyed.

The intermetallic compound favorably includes about 1 to 20 percent by weight of the substitutional element based on a sum of the intermetallic compound and the substitutional element. When the content of the substitutional element is less than 1 percent by weight, the effect of the addition is insufficient: the crystal growth of the gamma phase may be insufficient; and ductility of the intermetallic compound and mechanical strength may not be enough. On the other hand, when the content of the substitutional element is more than 20 percent by weight, a ratio of forming the gamma phase may decrease.

In view of the favorable balance in the gamma phase formation and mechanical strength, the intermetallic compound further favorably includes about 2 to 10 percent by weight of the substitutional element based on a sum of the intermetallic compound and the substitutional element.

In case of the interstitial element as the third additional element, the intermetallic compound favorably includes about 0.005 to 0.5 percent by weight of the interstitial element based on a sum of the intermetallic compound and the interstitial element. When the content of the interstitial element is less than 0.005 percent by weight, the effect of the addition is insufficient, similar to the substitutional element: the crystal growth of the gamma phase may be insufficient; and ductility of the intermetallic compound and mechanical strength may not be enough. On the other hand, when the content of the interstitial element is more than 0.5 percent by weight, a ratio of forming a phase mechanically brittle increases and the effect on ductility at low temperatures may be insufficient.

C. Specific Embodiment

Specifically, the intermetallic compound including TiAl as a major element is the most favorable among those mentioned above, and said intermetallic compound is especially preferable with the presence of twins and the third additional element at the grain boundary segregating or forming a second phase. Ti and Al in the intermetallic compound have such advantages as easily forming the gamma phase, superior resistance against corrosion, light weight, high ductility and high toughness.

The TiAl based intermetallic compound preferably includes 25 to 45 percent by weight and further preferably includes 30 to 40 percent by weight based on a sum of the intermetallic compound and the third additional element and so on as 100 percent. When the Al content in the intermetallic compound is less than 25 percent by weight or more than 45 percent, a ratio of forming the gamma phase may decrease and a ratio of forming another brittle phase may increase. The Al content ranging from 30 to 40 percent most efficiently forms the gamma phase.

When ductility at low temperatures is emphasized, an addition of V and Zr are favorable. For example, Ti-33Al-13V, Ti-33Al-2Mn, and Ti-35Al-10Zr further improve ductility at low temperatures. Please note that numbers prior to the elements refer to percentage by weight.

D. Manufacturing Process

A method of manufacturing the intermetallic compound including twins and the third additional element in the grain boundary is not limited. For example, at least one of neutrons, light ions and electrons is irradiated onto the intermetallic compound so as to introduce nuclei of twins therein and to segregatedly precipitate a trace or small amount of the third additional element in the grain boundary. This method conveniently and rapidly gives uniform dispersion of twins and segregation and/or precipitation of the third additional element. The method may be applied to the intermetallic compound coated onto a favorable position or formed to a favorable shape.

In view of the ability to displace atoms constituting the materials from the lattice position thereof, neutrons having energy ranging from 0.01 to 1 megaelectron volt is preferable.

The light ion refers to H or He ion, and the light ion with energy of 30 kiloelectron volts to 1 megaelectron volt by an accelerator is favorable.

The electron is one of the elementary particles, and the electron energized to 0.5 to 3 megaelectron volt by the accelerator is preferable.

Hereinafter, an amount of irradiation of neutrons, light ions and electrons is explained. An amount of irradiation of neutrons and so on preferably corresponds to 0.01 to 5 displacement per atom. Less than 0.01 displacement per atom shows limited effect in introducing twins, thus not giving sufficient ductility at low temperatures. On the other hand, more than 5 displacement per atom may give excessive irradiation damage. In view of favorable balance in ductility at low temperatures and irradiation damage, 0.05 to 1.0 displacement per atom is further preferable.

Further, temperatures during the irradiation of neutrons, light ions, and electrons are explained.

Preferable temperatures during the irradiation depend on a melting point (Tm/° C.) of the intermetallic compound irradiated, and specifically, the temperatures during the irradiation preferably correspond to about 0.2 to 0.6 times as much as Tm, the melting point in Celsius of the intermetallic compound. When the temperatures during the irradiation are less than 0.2 times as much as the melting point in Celsius, twins may not grow to a sufficiently large size to be stable. On the other hand, when the temperatures are more than 0.6 times as much as the melting point in Celsius, a nucleus of a crystal that grows to a twin may not be formed. In view of the favorable balance in the twin growth and the nucleus formation, the temperatures during the irradiation further preferably correspond to about 0.3 to 0.5 times as much as the melting point in Celsius of the intermetallic compound.

For example, TiAl as the intermetallic compound has a melting point of about 1460° C., and the temperatures during the irradiation preferably range from 300° to 800° C., and further preferably range from 400° to 700° C.

In the present invention, a method of manufacturing an intermetallic compound prior to the irradiation by neutrons, light ions or electrons is not limited. For example, the intermetallic compound made by a powder metallurgy method, such as hot isostatic pressing and isothermal forging is preferable since the powder metallurgy method decreases sizes of the grains and improve toughness.

In the isothermal forging, the intermetallic compound is preferably treated at temperatures of 800° to 1000° C. so as to complete the recrystallization. When the temperature is higher than 1000° C., the grains may become too large. On the other hand, when the temperature is less than 800° C., it is difficult to sufficiently complete the recrystallization.

EXAMPLES

Hereinafter, the present invention is explained by way of the Examples.

Example 1

The cladding for a light-water reactor of FIG. 3 was made in the following conditions and evaluated. As a result, the cladding for the light-water reactor gave limited irradiation growth by neutrons and had superior mechanical strength and high ductility.

A. Cladding for Light-Water Reactor
length: 4000 mm
outer diameter: 9.5 mm
wall thickness: 0.6 mm
materials: Ti-33Al
the number of the cladding: 204

Please note that the material for the cladding was irradiated with neutrons prior to forming the tube.

B. Making of Intermetallic Compound

A Ti-33Al alloy, which contains 67 percent by weight of Ti and 33 percent by weight of Al, as an intermetallic compound was formed into a plate by powder metallurgy. The starting material was a powder, a diameter of which ranged from 50 to 300 micrometers, and an average diameter was 250 micrometers. The powder was hot compacted and then formed into a more uniform powder by a plasma rotating electrode method so as to have a diameter ranging from 210 to 300 micrometers and an average diameter of 220 micrometers. The resultant powder was subject to hot isostatic pressing at 1050° C. under 1080 atmospheric pressures for three hours, followed by isothermal forging at 950° C. at a strain rate of $3.8 \times 10^{-4}$ per second till the compaction rate of 78 percent was achieved so as to give the alloy plate.

A microstructure of the alloy plate thus obtained was observed by an electron microscope to find a number of grains: about half of the grains were made of the $\alpha_2$ phase and the other grains were made of the gamma phase. Both of the $\alpha_2$ grains and the gamma grains had an average diameter of 2.0 micrometers and equiaxial.

The alloy plate was exposed to neutrons having energy higher than 1 megaelectron volt by JRR-2, which was made by Japan Atomic Energy Research Center, at 600° C. with an irradiation amount of about 0.05 displacement per atom, which correspond to about $1 \times 10^{24}$ neutrons per square meter. The alloy plate was formed into the aforementioned cladding for the light-water reactor.

Figure 4:
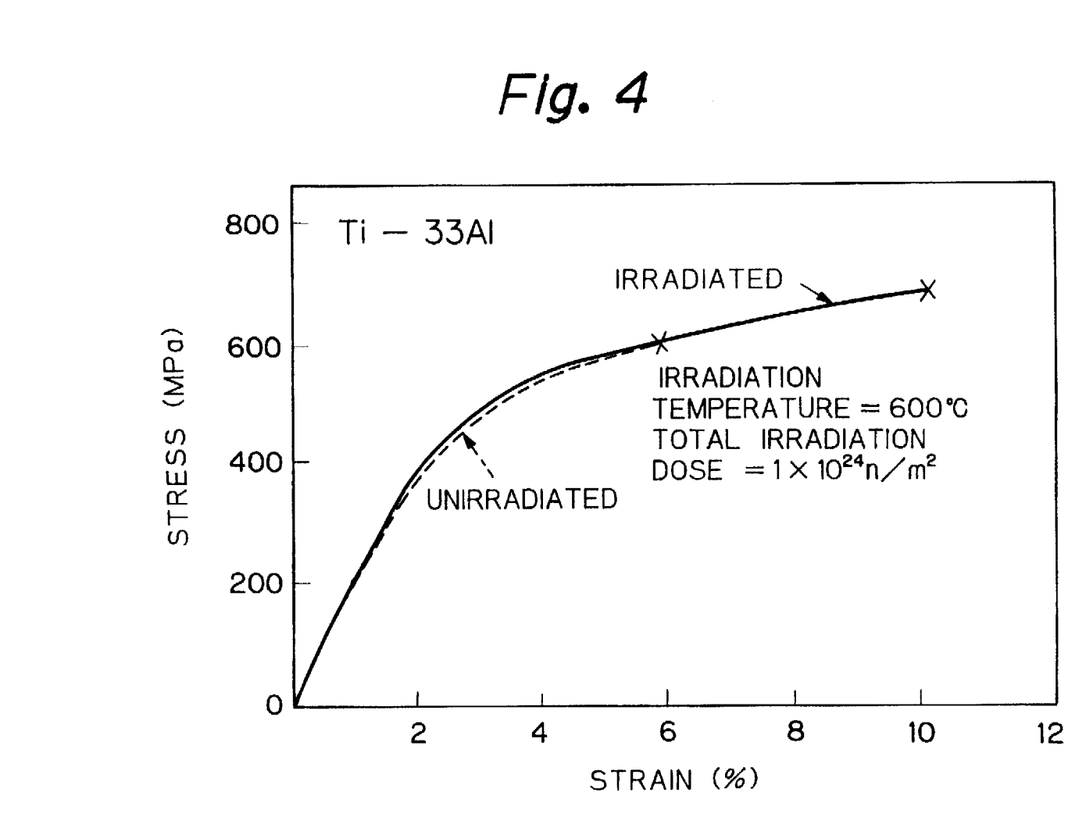
FIG. 4 is a graph of correlation between stress and strain of parts of the present invention.

The alloy plate exposed to neutrons was subject to a tension test to give the correlation between the stress and strain of FIG. 4.

Example 2

Example 2 has the same conditions as Example 1 except for an irradiation amount of about 0.5 displacement per atom, which correspond to about $1 \times 10^{25}$ neutrons per square meter. Example 2 gave basically the same result as Example 1.

Example 3

The cladding for a light-water reactor of FIG. 3 was made in the following conditions and evaluated.

A. Cladding for Light-Water Reactor
length: 4000 mm
outer diameter: 9.5 mm
wall thickness: 0.6 mm
materials: Ti-33Al
the number of the cladding: 49

Please note that the material for the cladding was not irradiated with neutrons prior to forming the tube.

B. Making of Intermetallic Compound

A Ti-33Al alloy as an intermetallic compound was formed into a plate by powder metallurgy. The starting material was a powder, a diameter of which ranged from 50 to 300 micrometers, and an average diameter was 250 micrometers. The powder was hot compacted and then formed into a more uniform powder by a plasma rotating electrode method so as to have a diameter ranging from 210 to 300 micrometers and an average diameter of 220 micrometers. The resultant powder was subject to hot isostatic pressing at 1050° C. under 1080 atmospheric pressures for three hours, followed by isothermal forging at 950° C. at a strain rate of $3.8 \times 10^{-4}$ per second till the compaction rate of 78 percent was achieved so as to give the alloy plate.

A microstructure of the alloy plate thus obtained was observed by an electron microscope to find a number of grains: about half of the grains were made of the $\alpha_2$ phase and the other grains were made of the gamma phase. Both of the $\alpha_2$ grains and the gamma grains had an average diameter of 2.0 micrometers and equiaxial.

The alloy plate was subject to the tension test to give the correlation between the stress and strain of FIG. 4.

Comparative Example 1

Figure 5:
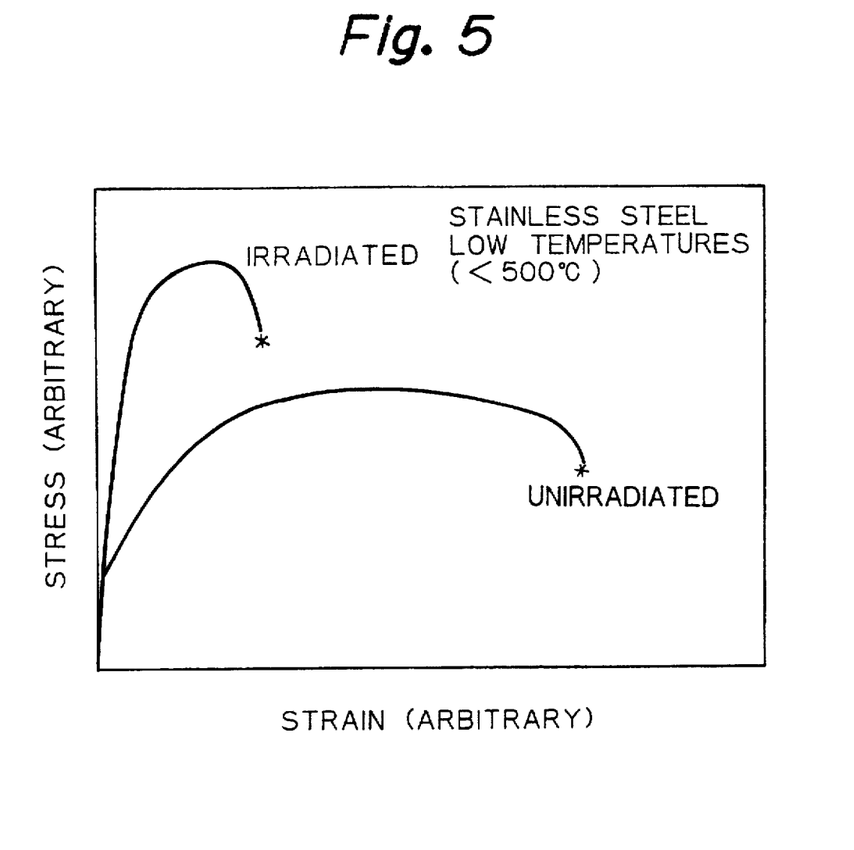
FIG. 5 is a graph of typical correlation between stress and strain of stainless steels.

A stainless steel irradiated with electron beams and another stainless steel free of the irradiation were subject to the tensile test to give the correlation between the stress and strain of FIG. 5. Please note that the stainless steel was one of the typical structural materials for atomic reactors. FIG. 5 shows that a typical example of stress-strain curves of stainless steel after neutron irradiation, which shows that the materials have limited ductility.

A part of a light-water reactor using the intermetallic compound according to the present invention solves conventional problems, has limited irradiation degradation by fast neutrons and improved ductility so that fuel assembly sustains stable over a long period at, high temperatures.

Neutron irradiation and so on onto the intermetallic compound introduces twins therein so as to further improve ductility of a part of a light-water reactor, for example, a cladding for the light-water reactor, thereby enabling to stabilize fuel assembly from the beginning.

It is to be understood that various alterations, modifications and/or additions which may occur to those skilled in the art may be made to the features of possible and preferred embodiments of the invention as herein described without departing from the spirit and scope of the invention as defined in the claims.

What is claimed is:

1. A part of a light-water reactor comprising at least one treated intermetallic compound selected from the group of intermetallic compounds consisting of $Ni_3Al$, $Ni_2Al_3$, TiAl, $Ti_3Al$, $Pt_2Si$, PtSi, $FeAl_2$, CoAl, and $MoSi_2$, wherein said treated intermetallic compound is produced by a process comprising a step of irradiating the intermetallic compound with at least one selected from the group consisting of a neutron, a light ion, and an electron at temperatures of 0.2 to 0.6 times the melting temperature of the compound, in ° C., with an amount of irradiation of 0.01 to 5.0 displacement per atom.

2. A part according to claim 1, wherein said intermetallic compound contains a grain therein, which further contains a twin therein.

3. A part according to claim 1, wherein said intermetallic compound further includes at least one of a substitutional element and an interstitial element as third additional element.

4. A part according to claim 3, wherein said substitutional element includes at least one of V, Cr, Zr, and Mn, and said intermetallic compound includes about 1 to 20 percent by weight of said substitutional element based on a sum of said intermetallic compound and said substitutional element.

5. A part according to claim 3, wherein said interstitial element includes at least one of B and C, and said intermetallic compound includes about 0.05 to 0.5 percent by weight of said interstitial element based on a sum of said intermetallic compound and said interstitial element.

* * * * *

UNITED STATES PATENT AND TRADEMARK OFFICE
CERTIFICATE OF CORRECTION

PATENT NO.    : 5,735,974
DATED         : April 7, 1998
INVENTOR(S)   : Akimichi Hishinuma et al.

It is certified that error appears in the above-identified patent and that said Letters Patent is hereby corrected as shown below:

Title page,
Item [73] Assignee: delete "Japan Atomic Energy Research" and insert -- Japan Atomic Energy Research Institute --.

Signed and Sealed this

Eighteenth Day of December, 2001

Attest:

*Attesting Officer*

JAMES E. ROGAN
*Director of the United States Patent and Trademark Office*